United States Patent
Hong et al.

(10) Patent No.: US 10,915,432 B2
(45) Date of Patent: Feb. 9, 2021

(54) TEST CASE MANAGEMENT SYSTEM AND METHOD

(71) Applicants: HYUNDAI MOTOR COMPANY, Seoul (KR); KIA MOTORS CORPORATION, Seoul (KR)

(72) Inventors: Seok Ki Hong, Suwon-si (KR); Yon-Soo Jong, Seoul (KR); Kyung-Hwa Choi, Seoul (KR); Hyun-Seop Bae, Seoul (KR); Seung-Uk Oh, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 450 days.

(21) Appl. No.: 15/837,836

(22) Filed: Dec. 11, 2017

(65) Prior Publication Data
US 2019/0146903 A1   May 16, 2019

(30) Foreign Application Priority Data

Nov. 13, 2017   (KR) .................. 10-2017-0150232

(51) Int. Cl.
*G06F 11/36*   (2006.01)
(52) U.S. Cl.
CPC ...... *G06F 11/3684* (2013.01); *G06F 11/3692* (2013.01)
(58) Field of Classification Search
CPC .................. G06F 11/3684; G06F 11/3692
See application file for complete search history.

(56) References Cited

U.S. PATENT DOCUMENTS

| | | | | |
|---|---|---|---|---|
| 7,203,928 | B2* | 4/2007 | Mandava | G06F 11/3688 714/E11.207 |
| 8,266,592 | B2* | 9/2012 | Beto | G06F 11/3688 717/124 |
| 9,996,451 | B2* | 6/2018 | Andrejko | G06F 11/3672 |
| 10,437,712 | B1* | 10/2019 | Tyler | G06F 11/3684 |
| 2006/0253741 | A1* | 11/2006 | Garakani | G06F 11/3688 714/38.11 |
| 2010/0070231 | A1 | 3/2010 | Hanumant | |
| 2012/0311541 | A1* | 12/2012 | Bullard | G06F 11/368 717/127 |
| 2014/0040867 | A1* | 2/2014 | Wefers | G06F 11/3684 717/131 |
| 2014/0115565 | A1* | 4/2014 | Abraham | G06F 8/30 717/128 |

(Continued)

FOREIGN PATENT DOCUMENTS

JP   2013-077124 A   4/2013
KR   10-0790470 B1   1/2008
(Continued)

*Primary Examiner* — Matthew M Kim
*Assistant Examiner* — Indranil Chowdhury
(74) *Attorney, Agent, or Firm* — Morgan, Lewis & Bockius LLP

(57) ABSTRACT

A test case management system includes an input and output (I/O) interface for receiving a first test case, a database (DB) for storing a second test case, and a controller for comparing the first test case with the second test case based on a similarity score between a string of the first test case and a string of the second test case.

14 Claims, 13 Drawing Sheets

(56) References Cited

U.S. PATENT DOCUMENTS

| | | | | |
|---|---|---|---|---|
| 2016/0117239 A1* | 4/2016 | Hamilton, II | ....... | G06F 11/3684 |
| | | | | 717/124 |
| 2017/0123951 A1* | 5/2017 | Abdirashid | ........... | G06F 11/263 |
| 2017/0161180 A1* | 6/2017 | Raghavan | ........... | G06F 11/3684 |
| 2017/0199811 A1* | 7/2017 | Narayan | ............. | G06F 11/3684 |
| 2018/0018248 A1* | 1/2018 | Bhargava | ............ | G06F 11/3006 |
| 2018/0239687 A1* | 8/2018 | Saha | ..................... | G06F 11/366 |
| 2018/0260314 A1* | 9/2018 | Singi | ................... | G06F 11/3676 |
| 2019/0155572 A1* | 5/2019 | Misra | .................... | G06F 11/263 |
| 2020/0019494 A1* | 1/2020 | Kwon | .................. | G06F 11/263 |

FOREIGN PATENT DOCUMENTS

| KR | 10-2012-0040419 | 4/2012 |
|---|---|---|
| KR | 10-2012-0111154 | 10/2012 |
| KR | 10-1410099 B1 | 6/2014 |
| KR | 10-1588027 | 1/2016 |

\* cited by examiner

FIG. 1

| 11 | 12 | 13 | 14 | 15 | 16 | 17 |
|---|---|---|---|---|---|---|
| TEST CASE ID | TEST TARGET | ENVIRONMENTAL CONDITION | TEST PERFORMANCE PROCEDURE | EXPECTED VALUE | ACTUAL OUTPUT VALUE | TEST RESULT |

| | → BACKTRACKING PROCESS | | | | | |
|---|---|---|---|---|---|---|
| | - | D | E | S | I | G | N |
| - | 0 | 0 | 0 | 0 | 0 | 0 | 0 |
| I | 0 | 0 | 0 | 0 | 5 | 4 | 3 |
| D | 0 | 5 | 4 | 3 | 4 | 4 | 3 |
| E | 0 | 4 | 10 | 9 | 8 | 7 | 6 |
| A | 0 | 3 | 9 | 9 | 8 | 7 | 6 |
| S | 0 | 2 | 8 | 14 | 13 | 12 | 11 |

FIG. 7

|   | –  | D   | E   | S   | I   | G   | N   |
|---|----|-----|-----|-----|-----|-----|-----|
| – | 0  | -15 | -30 | -45 | -60 | -75 | -90 |
| I | -15| -15 | -30 | -45 | -35 | -50 | -65 |
| D | -30| -5  | -20 | -35 | -50 | -50 | -65 |
| E | -45| -20 | 5   | -10 | -25 | -40 | -55 |
| A | -60| -35 | -10 | -10 | -25 | -40 | -55 |
| S | -75| -50 | -25 | 0   | -15 | -30 | -45 |

FIG. 9A

| | - | P | o | p | N | o | i | s | e | s | h | o | u | l | d | n | | t | o | c | c | u | r |
|---|---|---|---|---|---|---|---|---|---|---|---|---|---|---|---|---|---|---|---|---|---|---|---|
| - | 0 | -15 | -30 | -45 | -60 | -75 | -90 | -105 | -120 | -135 | -150 | -165 | -180 | -195 | -210 | -225 | -240 | -255 | -270 | -285 | -300 | -315 | -330 | -345 | -360 | -375 |
| P | -15 | 10 | -5 | -20 | -35 | -50 | -65 | -80 | -95 | -110 | -125 | -140 | -155 | -170 | -185 | -200 | -215 | -230 | -245 | -260 | -275 | -290 | -305 | -320 | -335 | -350 |
| R | -30 | -5 | -5 | -20 | -35 | -50 | -65 | -80 | -95 | -110 | -125 | -140 | -155 | -170 | -185 | -200 | -215 | -230 | -245 | -260 | -275 | -290 | -305 | -320 | -335 | -350 |
| E | -45 | -20 | -20 | -20 | -35 | -50 | -65 | -80 | -95 | -110 | -125 | -140 | -155 | -170 | -185 | -200 | -215 | -230 | -245 | -260 | -275 | -290 | -305 | -320 | -335 | -350 |
| S | -60 | -35 | -35 | -35 | -35 | -50 | -65 | -80 | -95 | -110 | -125 | -140 | -155 | -170 | -185 | -200 | -215 | -230 | -245 | -260 | -275 | -290 | -305 | -320 | -335 | -350 |
| E | -75 | -50 | -50 | -50 | -50 | -50 | -65 | -80 | -95 | -110 | -125 | -140 | -155 | -170 | -185 | -200 | -215 | -230 | -245 | -260 | -275 | -290 | -305 | -320 | -335 | -350 |
| T | -90 | -65 | -65 | -65 | -65 | -65 | -65 | -80 | -95 | -110 | -125 | -140 | -155 | -170 | -185 | -200 | -215 | -230 | -245 | -260 | -275 | -290 | -305 | -320 | -335 | -350 |
| | -105 | -80 | -80 | -80 | -70 | -70 | -80 | -95 | -100 | -115 | -130 | -145 | -155 | -170 | -185 | -205 | -220 | -235 | -250 | -265 | -280 | -295 | -310 | -325 | -325 | -325 |
| M | -120 | -95 | -95 | -95 | -85 | -85 | -95 | -100 | -110 | -125 | -130 | -145 | -150 | -165 | -180 | -205 | -220 | -235 | -250 | -265 | -280 | -295 | -310 | -325 | -325 | -325 |
| E | -135 | -110 | -110 | -110 | -100 | -100 | -100 | -110 | -115 | -125 | -140 | -130 | -145 | -150 | -165 | -180 | -205 | -220 | -235 | -250 | -265 | -280 | -295 | -310 | -325 | -325 |
| M | -150 | -125 | -125 | -125 | -115 | -115 | -115 | -115 | -125 | -130 | -145 | -145 | -140 | -150 | -165 | -180 | -195 | -220 | -235 | -250 | -265 | -280 | -295 | -310 | -325 | -325 |
| O | -165 | -140 | -140 | -140 | -130 | -130 | -130 | -130 | -130 | -140 | -145 | -155 | -155 | -150 | -165 | -180 | -195 | -210 | -235 | -250 | -265 | -280 | -295 | -310 | -325 | -325 |
| R | -180 | -155 | -155 | -155 | -145 | -145 | -145 | -145 | -145 | -145 | -150 | -160 | -170 | -170 | -165 | -180 | -195 | -210 | -225 | -250 | -265 | -280 | -295 | -310 | -325 | -325 |
| Y | -195 | -170 | -170 | -170 | -150 | -150 | -150 | -150 | -150 | -150 | -150 | -165 | -170 | -180 | -180 | -180 | -195 | -210 | -225 | -240 | -265 | -280 | -295 | -310 | -325 | -325 |
| | -210 | -185 | -185 | -185 | -175 | -175 | -175 | -175 | -175 | -165 | -165 | -165 | -170 | -180 | -195 | -195 | -195 | -210 | -225 | -240 | -255 | -280 | -295 | -310 | -325 | -300 |
| / | -225 | -200 | -200 | -200 | -190 | -190 | -190 | -190 | -190 | -180 | -180 | -180 | -180 | -180 | -195 | -210 | -210 | -210 | -225 | -240 | -255 | -270 | -295 | -310 | -325 | -300 |
| P | -240 | -215 | -215 | -215 | -205 | -205 | -205 | -205 | -205 | -195 | -195 | -195 | -195 | -195 | -195 | -210 | -225 | -225 | -225 | -240 | -255 | -270 | -285 | -310 | -325 | -300 |
| R | -255 | -230 | -230 | -230 | -220 | -220 | -220 | -220 | -220 | -210 | -210 | -210 | -210 | -210 | -205 | -220 | -230 | -240 | -240 | -240 | -255 | -270 | -285 | -300 | -325 | -300 |
| E | -270 | -245 | -245 | -245 | -235 | -235 | -235 | -235 | -235 | -225 | -225 | -225 | -225 | -225 | -220 | -220 | -230 | -240 | -255 | -255 | -255 | -270 | -285 | -300 | -315 | -300 |
| S | -285 | -260 | -260 | -260 | -250 | -250 | -250 | -250 | -250 | -240 | -240 | -240 | -240 | -240 | -240 | -235 | -240 | -250 | -260 | -270 | -270 | -270 | -285 | -300 | -315 | -300 |
| E | -300 | -275 | -275 | -275 | -265 | -265 | -265 | -265 | -265 | -255 | -255 | -255 | -255 | -255 | -255 | -250 | -255 | -260 | -270 | -285 | -285 | -285 | -285 | -300 | -315 | -300 |
| T | -315 | -290 | -290 | -290 | -280 | -280 | -280 | -280 | -280 | -270 | -270 | -270 | -270 | -270 | -270 | -265 | -270 | -270 | -285 | -300 | -300 | -300 | -300 | -300 | -315 | -315 |
| | -330 | -305 | -305 | -305 | -295 | -295 | -295 | -295 | -295 | -285 | -285 | -285 | -285 | -285 | -285 | -280 | -285 | -285 | -285 | -300 | -315 | -315 | -315 | -315 | -315 | -330 |
| N | -345 | -320 | -320 | -320 | -310 | -310 | -310 | -310 | -310 | -300 | -300 | -300 | -300 | -300 | -285 | -300 | -300 | -290 | -290 | -275 | -275 | -290 | -305 | -305 | -320 | -335 |
| O | -350 | -335 | -335 | -335 | -325 | -325 | -315 | -315 | -330 | -330 | -315 | -315 | -315 | -315 | -285 | -315 | -315 | -285 | -290 | -275 | -290 | -290 | -290 | -305 | -320 | -335 |
| | -375 | -350 | -350 | -350 | -340 | -340 | -330 | -330 | -330 | -330 | -330 | -330 | -330 | -330 | -330 | -330 | -330 | -315 | -305 | -290 | -305 | -305 | -305 | -305 | -320 | -335 |
| / | -390 | -355 | -355 | -355 | -355 | -355 | -330 | -330 | -330 | -330 | -330 | -330 | -330 | -330 | -330 | -330 | -330 | -330 | -285 | -305 | -320 | -320 | -320 | -320 | -320 | -335 |
| | -405 | -390 | -390 | -390 | -390 | -355 | -340 | -345 | -345 | -345 | -345 | -345 | -345 | -345 | -330 | -330 | -330 | -285 | -300 | -305 | -305 | -305 | -305 | -320 | -320 | -335 |

| SIMILARITY RANGE | TOTAL NUMBER OF CANDIDATES IN RANGE | NUMBER OF MERGEABLE CANDIDATES IN RANGE | MERGEABLE RATIO IN RANGE |
|---|---|---|---|
| 100% | 114 | 101 | 88.6% |
| 99~90% | 610 | 415 | 68.0% |
| 89~80% | 858 | 240 | 28.0% |

FIG. 12

| CANDIDATE GROUP FOR MERGING | FM | AM | RDS | SXM | USB | My Music | IPOD | AUX | TOTAL |
|---|---|---|---|---|---|---|---|---|---|
| NUMBER OF EXISTING T/C | 96 | 96 | 46 | 120 | 357 | 208 | 214 | 16 | 1,153 |
| NUMBER OF REMOVED DUPLICATE T/C | 0 | 0 | 0 | 0 | 2 | 0 | 1 | 0 | 3 |
| NUMBER OF MERGED T/C | 23 | 23 | 17 | 42 | 121 | 49 | 48 | 6 | 329 |
| NUMBER OF T/C AFTER MERGING | 73 | 73 | 29 | 78 | 234 | 159 | 165 | 10 | 821 |

TEST CASE MANAGEMENT SYSTEM AND METHOD

CROSS-REFERENCE TO RELATED APPLICATION

This application claims the benefit of priority to Korean Patent Application No. 10-2017-0150232, filed on Nov. 13, 2017 with the Korean Intellectual Property Office, the entire disclosure of which is incorporated herein by reference.

TECHNICAL FIELD

Embodiments of the present disclosure relate to a test case management system and method for multimedia equipment.

BACKGROUND

A test of general multimedia equipment includes a process in which a user operates the equipment by himself or herself according to content specified in a test case, and determines whether a result value output from the equipment satisfies an expected value, or threshold.

Since a test performed in one piece of multimedia equipment may include a plurality of test cases and a user operates and performs the test by himself or herself, a large amount of time may be required. Also, when one test case includes many performance procedures, device operations may be frequently required, and test efficiency may be lowered.

When a plurality of test cases is managed according to the related art, the cases are classified by intuition and experience of a user, and a user manually manages the test cases. For this reason, similar or duplicate cases are tested again, which leads to a reduction of test efficiency and consumes large costs and large amounts of time.

SUMMARY

Therefore, it is an aspect of the present disclosure to provide a test case management system and method that analyze similarities by comparing test cases to be used and test cases that have been compared with other stored test cases and stored, classify the plurality of test cases according to analysis results, and thereby make it possible to improve test efficiency and prepare for a quantitative standard for managing test cases.

Additional aspects of the disclosure will be set forth in part in the description which follows and, in part, will be obvious from the description, or may be learned by practice of the disclosure.

In accordance with one aspect of the present disclosure, a test case management system includes: an input and output (I/O) interface configured to receive a first test case; a database (DB) configured to store a second test case; and a controller configured to compare the first test case with the second test case based on a similarity score between a string of the first test case and a string of the second test case.

The similarity score may be calculated based on a ratio of a score calculated based on the number of letters of the string of the first test case and the number of letters of the string of the second test case to a score of all the strings.

Each of the first test case and the second test case may include at least one of a test performance procedure and an expected value.

The controller may calculate similarity scores by separately comparing strings included in the test performance procedures and the expected values, and calculate the overall similarity score by adjusting and using weights for the similarity score between the test performance procedures and the similarity score between the expected values.

The controller may compare the similarity score with a predetermined range and classify the first test case.

The controller may classify the first test case as a new test case when the similarity score is smaller than a minimum reference value of the predetermined range, and the DB may store the first test case as a new test case.

The controller may merge the first test case with the second test case when the similarity score is within the predetermined range, and the DB may store the merged second test case.

The controller may discard the first test case when the similarity score exceeds a maximum reference value of the predetermined range.

The controller may test multimedia equipment according to a performance procedure of the first test case based on a result of the classification.

When a part of the string of the first test case and a part of the string of the second test case are pre-stored antonyms to each other, the controller may modify the similarity score and compare the first test case with the second test case.

In accordance with another aspect of the present disclosure, a test case management method includes: receiving a first test case; storing a second test case; and comparing the first test case with the second test case based on a similarity score between a string of the first test case and a string of the second test case.

The similarity score may be calculated based on a ratio of a score calculated based on the number of letters of the string of the first test case and the number of letters of the string of the second test case to a score of all the strings.

Each of the first test case and the second test case may include at least one of a test performance procedure and an expected value.

The comparing of the first test case with the second test case may include calculating similarity scores by separately comparing strings included in the test performance procedures and the expected values, and comparing the first test case with the second test case by adjusting weights for the similarity score between the test performance procedures and the similarity score between the expected values.

The test case management method may further include comparing the similarity score with a predetermined range and classifying the first test case.

The classifying of the first test case may include classifying the first test case as a new test case when the similarity score is smaller than a minimum reference value of the predetermined range, and the storing of the second test case may include storing the first test case as a new test case.

The classifying of the first test case may include merging the first test case with the second test case when the similarity score is within the predetermined range, and the storing of the second test case may include storing the merged second test case.

The classifying of the first test case may include discarding the first test case when the similarity score exceeds a maximum reference value of the predetermined range.

The test case management method may further include testing multimedia equipment according to a performance procedure of the first test case based on a result of the classification.

The test case management method may further include outputting a result of the test through a display.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a diagram illustrating a test case according to exemplary embodiments of the present disclosure;

FIG. 6 is a diagram illustrating a Smith-Waterman algorithm according to exemplary embodiments of the present disclosure;

FIG. 7 is a diagram illustrating a similarity analysis method according to exemplary embodiments of the present disclosure;

FIGS. 8, 9A, and 9B are diagrams illustrating a method of calculating a similarity score of a test case according to exemplary embodiments of the present disclosure;

FIGS. 11 and 12 are diagrams illustrating effects of a test case management method according to exemplary embodiments of the present disclosure.

DETAILED DESCRIPTION

Figure 2:
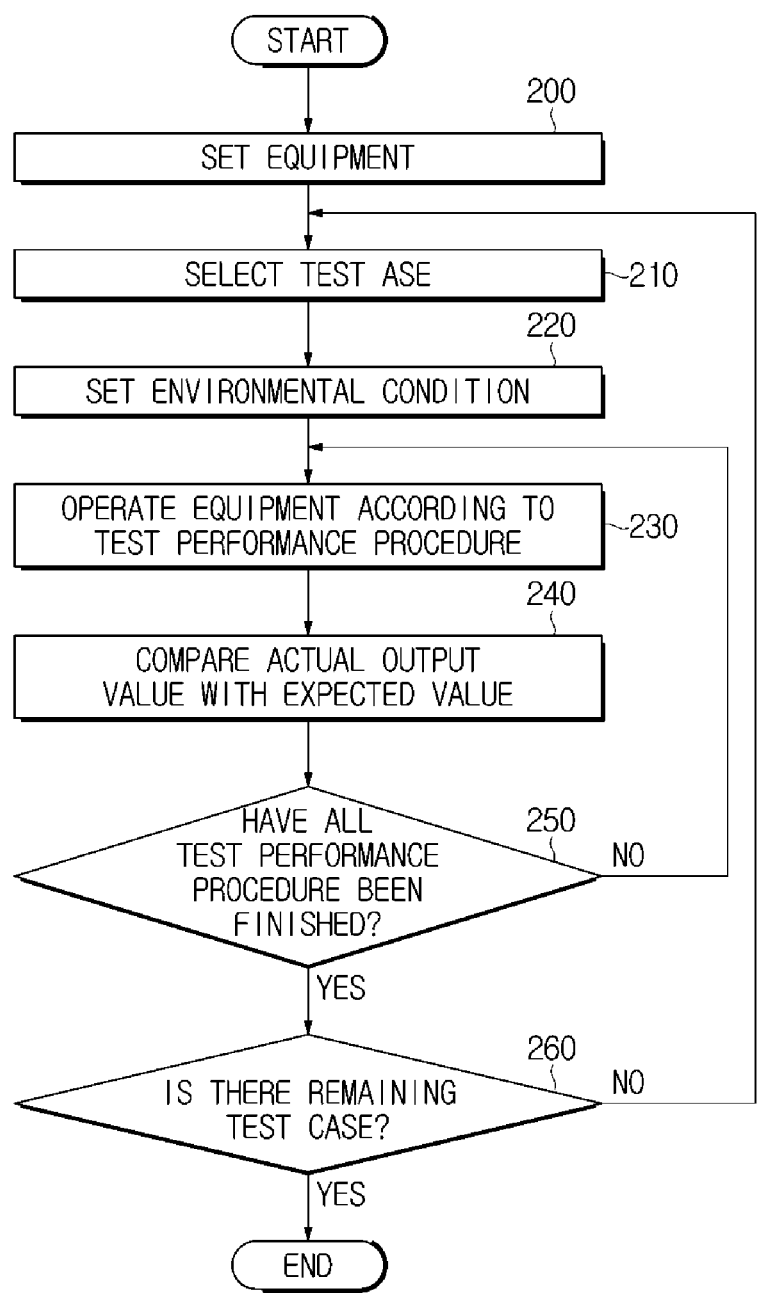
FIG. 2 is a flowchart illustrating a test operation of a test case management system according to exemplary embodiments of the present disclosure.

Like reference numerals refer to like elements throughout the specification. The specification does not describe all elements of embodiments, and details which are general in the technical field to which the present disclosure pertains or duplicated between embodiments will be omitted. The terms "unit," "module," "member," and "block" used herein may be implemented as software or hardware. Depending on embodiments, a plurality of "units," "modules," "members," or "blocks" may be implemented as one element, or one "unit," "module," "member," or "block" may include a plurality of elements.

Throughout the specification, when any one part is referred to as being "connected" to another part, it means that the parts are directly or indirectly connected, and the indirect connection includes a connection via a wireless communication network.

Also, when a part is referred to as "including" an element, it means that other elements are not excluded and may be further included unless particularly stated otherwise.

The terms "first," "second," and the like are used to distinguish one element from other elements, and elements are not limited by the aforementioned terms.

A singular expression includes the plural unless the context clearly indicates otherwise.

Identification codes of operations are used for convenience of description and do not indicate the order of operations. Unless operations are obviously described as a particular sequence in context, they may occur differently with specified order.

Hereinafter, principles and the like of disclosed embodiments will be described with reference to the accompanying drawings.

FIG. 1 is a diagram illustrating a test case according to exemplary embodiments of the present disclosure.

A test case 10 may have various forms according to domain. However, the test case 10 for multimedia equipment may include, as shown in FIG. 1, a test case identifier (ID) 11, a test target 12, an environmental condition 13, a test performance procedure 14, an expected value 15, an output value 16 and a test result 17.

Specifically, the test case ID 11 is a name for distinguishing a plurality of test cases 10 applied to multimedia equipment. As will be described below, when the collected ID 11 of a test case 20 (see FIG. 3) is the same as an ID of a previously stored test case 30 (see FIG. 3), a test case management system 1 may determine that the test case 20 is a duplicate test case.

The test target 12 according to an example may include multimedia equipment that is a test target of a test case. The environmental condition 13 may denote a setting for the test case management system 1 including the multimedia equipment, which is the test target, to perform a test using the test case 10.

The test performance procedure 14 denotes an input value that is input to the multimedia equipment. The input value, that is, an operation result of the multimedia equipment according to a test performance procedure, becomes a test result. The test performance procedure 14 denotes detailed tests included when the single test case 10 proceeds, and may include one or more test performance procedures. Details of a test performance procedure will be described below.

The expected value 15 is a value desired to be output from the test target according to the test performance procedure 14. In other words, the test case management system 1 compares the output value 16 output from the test target and the expected value and then determines that the test target has passed the test performance procedure 14 when the output value 16 satisfies the expected value 15.

When the expected value is satisfied, the test case management system 1 classifies the test result 17 as "normal" or "failure," and proceeds with another test performance procedure 14 in the test case 10 or a test case 10 having another test case ID 11. A procedure for multimedia equipment based on a test case 10 will be described in detail with reference to the following drawings.

FIG. 2 is a flowchart illustrating a test operation of a test case management system according to exemplary embodiments of the present disclosure.

Referring to FIG. 2, equipment including multimedia equipment, which is a test target, and the like is set (200).

Subsequently, a tester selects at least one test case from among a plurality of test cases 10 (210).

Here, the tester may be a system 1 configured to test multimedia equipment or a person who performs a test by himself or herself.

Subsequently, an environmental condition 13 of the multimedia equipment is set based on the selected test case 10. Setting of the environmental condition 13 is to operate the multimedia equipment based on a condition predetermined in the test case 10.

When the environmental condition 13 is set, the tester operates the test target, that is, the multimedia equipment, based on a test performance procedure 14 (230).

Subsequently, the tester compares an actual output value 16 and an expected value 15 (240).

In other words, it is determined whether the actual output value 16 output by the multimedia equipment satisfies the expected value 15. When the actual output value 16 does not satisfy the expected value 15, a test result 17 according to the single test performance procedure 14 is "failure," and when the actual output value 16 satisfies the expected value 15, the test result 17 is "normal."

The single test case 10 may include a plurality of test performance procedures 14. Even when the single test performance procedure 14 that has resulted in the output is completed, it is necessary to proceed with other test performance procedures 14.

Therefore, the tester determines whether all the test performance procedures 14 have been finished (250).

When there is a remaining test performance procedure 14, the tester operates the multimedia equipment according to the remaining test performance procedure 14, compares an actual output value 16 and the expected value 15 and outputs a test result 17.

When all the test performance procedures 14 in the single test case 10 are completed, the tester determines whether there are remaining test cases 10 (260). When there are remaining test cases 10, the tester selects a test case 10 to be used again. When results of all the test cases 10 are output, the test is finished.

When such a test proceeds, a test time may be delayed according to the number of test performance procedures 14 in the test cases 10 and the number of test cases. In other words, the tester is required to frequently operate a device that is a test target according to the plurality of test performance procedures 14, select the several test cases 10 one by one, and perform the test. Therefore, a large amount of test time is required.

According to related art, since a user manually classifies numerous test cases 10 by himself or herself, even a similar or duplicate test case 10 is used for a test again, and test efficiency is low. According to an embodiment disclosed below, a test case management system 1 and a test case management method that proposes a standard for classifying or merging numerous test cases 10 will be provided.

Figure 3:
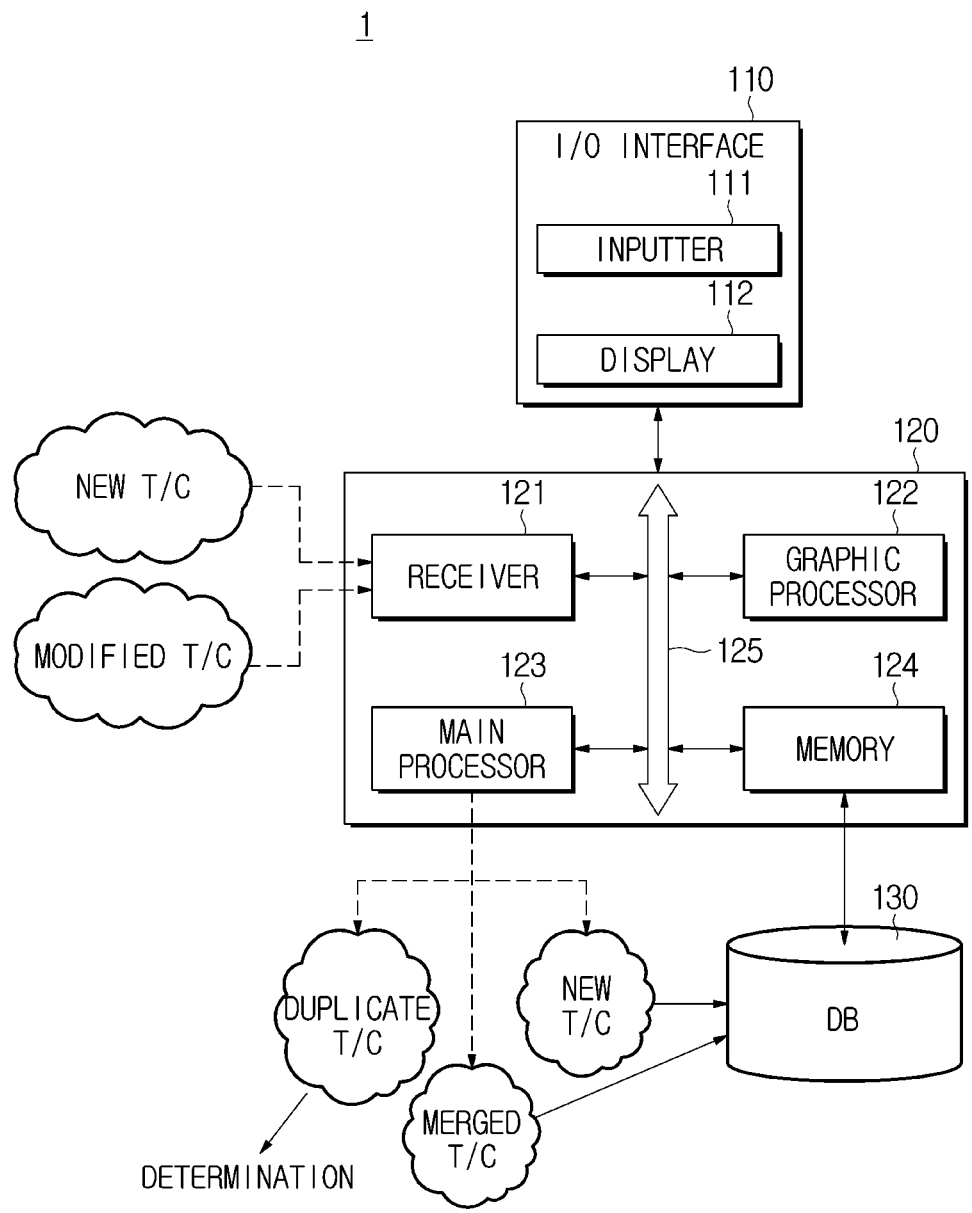
FIG. 3 is a control block diagram of a test case management system 1 according to exemplary embodiments of the present disclosure.

FIG. 3 is a control block diagram of the test case management system 1 according to a disclosed example according to exemplary embodiments of the present disclosure.

Referring to FIG. 3, the test case management system 1 includes an input and output (I/O) interface 110 configured to receive an input command of a user and outputs a test result, a controller 120 configured to manage test cases 10, and a database (DB) 130 configured to store merged and classified test cases 10.

Specifically, the I/O interface 110 may include an inputter 111 configured to receive an input command of a user and a display 112 configured to output test results 17, classification results, and the like.

The inputter 111 receives an input of a user and overall content of the test cases 10. As an example, the inputter 111 receives test case IDs 11 of the test cases 10 and strings of test performance procedures 14 and expected values 15 and transfers the test case IDs 11 and the strings to the controller 120.

The transferred strings are used to determine whether test cases 10 are similar, which will be described below. Meanwhile, hardware devices, such as various types of buttons or switches, a pedal, a keyboard, a mouse, a trackball, various types of levers, a handle, a stick, and the like, may be included for an input of a user. Also, the inputter 111 may include a graphical user interface (GUI), that is, a software device, such as a touchpad for a user input. The touchpad may be implemented as a touch screen panel (TSP) and forms a mutual layer structure with the display 112.

The display 112 may output the received strings and induce a user to determine whether to input the strings. Also, the display 112 outputs determinations made by the controller 120 regarding whether test cases are similar, and actual output values 16 and test results 17 according to the test cases 10.

The display 112 may be provided as a cathode ray tube (CRT), a digital light processing (DLP) panel, a plasma display panel, a liquid crystal display (LCD) panel, an electroluminescence (EL) panel, an electrophoretic display (EPD) panel, an electrochromic display (ECD) panel, a light-emitting diode (LED) panel, an organic LED (OLED) panel or the like, but the disclosure is not limited thereto.

In addition to these, the I/O interface 110 may include various components that connect a user and the system 1 such as an audio interface, for example, a speaker and the like.

The controller 120 controls all components of the test case management system 1.

Specifically, the controller 120 may include a receiver 121 configured to receive a new test case and a modified test case input through the I/O interface 110, a graphic processor 122 configured to generate a screen output to the display 112, a main processor 123 configured to determine similarities between the received test cases and stored test cases and classify the received test cases and a memory 124 configured to temporarily store an algorithm required for a control operation, test cases received from the DB 130 and the like. In addition, the controller 120 may include a data bus 125 configured to mediate data exchange between the I/O interface 121, the graphic processor 122, the main processor 123, and the memory 124.

First, the receiver 121 receives a test case 10. The test case 10 is classified as a new test case that has not been compared with stored test cases or a test case that has been compared with stored test cases but modified.

A new test case may be input when a new function is added to multimedia equipment, a new type of error that has not been detected occurs, or an existing scenario is changed or added.

On the other hand, a modified test case may be input when an existing test case is required to be modified due to a defect.

The receiver 121 receives a new test case or a modified test case and transfers the new test case or the modified test case to the main processor 123 through the data bus 125.

The main processor 123 compares the received new test case or modified test case with test cases stored in the DB 130, thereby determining a similarity.

From now, for convenience of description, a received test case will be referred to as a first test case, and a test case that has been tested already and stored in the DB 130 will be referred to as a second test case. In other words, a first test case may be a new test case or a modified test case, and the main processor 123 classifies a first test case by comparing the first test case with second test cases.

A method in which the main processor 123 determines a similarity between a first test case and a second test case and then classifies the first test case will be described below with reference to FIG. 4.

The memory 124 stores the first test case transferred by the receiver 121 and second test cases that are received by the main processor 123 through the DB 130. In other words, the memory 124 temporarily stores the first test case and the second test cases that will be compared by the main processor 123.

Also, the memory 124 may temporarily store a control program and control data for controlling overall operation of the test case management system 1, a user command received by the I/O interface 110 and the like.

The memory 124 may not only include volatile memories such as a static random access memory (S-RAM) and a dynamic random access memory (D-RAM) but also include non-volatile memories such as a flash memory, a read-only memory (ROM), an erasable programmable read-only memory (EPROM), and an electrically erasable programmable read-only memory (EEPROM).

When it is determined that the first test case is a new test case as a similarity determination result, the main processor 123 classifies the first test case as a new test case and then stores the first test case in the DB 130. Subsequently, the new first test case becomes a second test case that will be compared with a test case newly transferred by the receiver.

When it is determined that the first test case is similar to a second test case, which is compared with the first test case, as a similarity determination result, the main processor 123 merges the first test case with the second test case and stores the merged test case in the DB 130.

The graphic processor 122 may perform various operations relating to image processing, such as a conversion of the classification result of the main processor 123 into an image to be displayed on the display 112, a conversion of a result transferred from the inputter 111 into a format that may be processed by the main processor 123 and the like.

Operations of the main processor 123, the graphic processor 122 and the memory 124 will be described below with a common designation, the controller 120. The controller 120 may further include various components that have not been described, and the components are not limited.

The DB 130 stores classified test cases that have been processed by the controller 120. Specifically, the DB 130 separately stores the classified test cases. As shown in FIG. 3, the controller 120 may classify input test cases into new test cases, merged test cases, and duplicate test cases. Here, duplicate test cases are first test cases that are compared with second test cases stored in the DB 130 and determined to be almost the same as second test cases stored in the DB 130, and thus are likely to cause a duplicate test. The controller 120 discards the duplicate test cases and stores the new test cases and the merged test cases in the DB 130.

The DB 130 may be implemented as at least one of a non-volatile memory device, such as a ROM, a PROM, an EPROM, an EEPROM, and a flash memory, and a storage medium, such as a hard disk drive (HDD) and a compact disc read-only memory (CD-ROM), but the present disclosure is not limited thereto.

The DB 130 may be provided separately from a chip that is implemented as the controller 120, and may exchange test cases with the controller 120 through a communication module. Here, the communication module includes all of a short-range communication module, a wired communication module, and a wireless communication module. For example, when the DB 130 and the controller 120 are connected through a wireless communication module, the DB 130 may be implemented in a server apart from the test case management system 1.

The configuration of the test case management system 1 illustrated in FIG. 3 is a mere example and may include additional other components or various modified examples.

Figure 4:
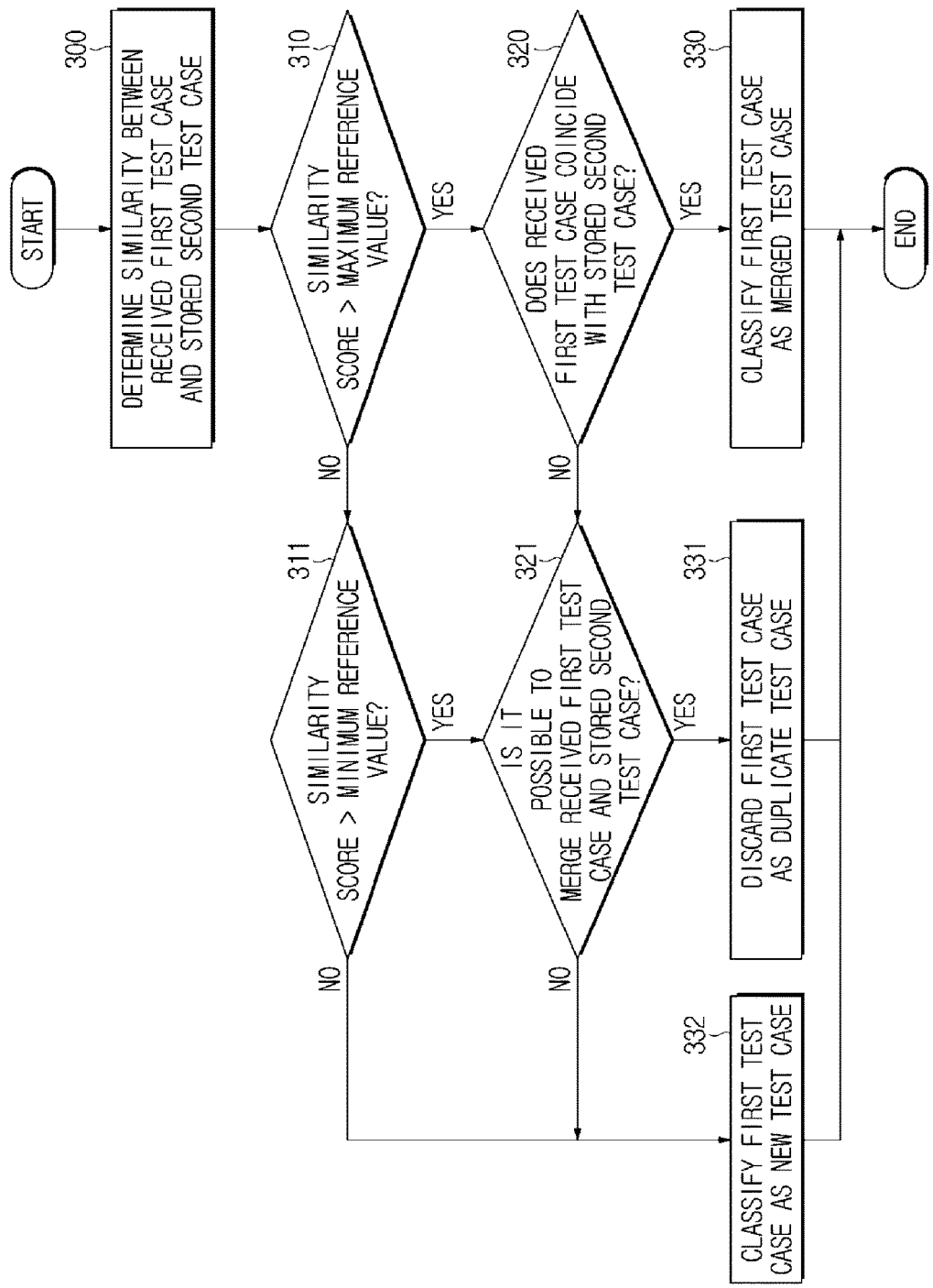
FIG. 4 is a flowchart illustrating a method of classifying a test case according to exemplary embodiments of the present disclosure.

FIG. 4 is a flowchart illustrating a method of classifying a test case according to exemplary embodiments of the present disclosure.

Referring to FIG. 4, the controller 120 determines a similarity between a received test case (a first test case) and a test case stored in the DB (a second test case) (300).

Specifically, a test case used for multimedia equipment is specified in a natural language. Therefore, in the disclosed example, a similarity between test cases is determined by comparing strings.

The controller 120 compares strings of test case IDs 11, test performance procedures 14, and expected values 15 among items of test cases 10 illustrated in FIG. 1. After comparing strings of each item, the controller 120 determines a similarity between the first test case and the second test case through a result of summing all similarity scores. In relation to a similarity determination method, the controller 120 calculates a similarity score by comparing strings included in items of the test cases. A method of calculating a similarity score is similar to a Smith-Waterman algorithm.

The Smith-Waterman algorithm is a method of comparing two strings letter by letter and then giving a score. However, according to the disclosed calculation method, a similarity score is calculated not by using the Smith-Waterman algorithm but by using a method obtained by modifying the Smith-Waterman algorithm to be applicable to a test case.

The method of calculating a similarity score will be described in detail below with reference to FIG. 5. When the similarity score is calculated, the controller 120 determines whether the calculated similarity score is included in a preset range and classifies the first test case.

Specifically, the controller 120 compares the calculated similarity score and a maximum reference value (310). When the calculated similarity score exceeds the maximum reference value, the controller 120 determines whether the first test case coincides with the second test case (320).

When all items of the first test case are the same as those of the second test case, the controller 120 determines that the received test case is the same as the already-stored test case and classifies the first test case as a duplicate test case (330).

As described above, when the first test case is classified as a duplicate test case, the controller 120 discards the first test case. When the calculated similarity score is smaller than the maximum reference value, the controller 120 determines whether similarity score exceeds a minimum reference value (311). When the similarity score is smaller than the minimum reference value, the controller 120 determines that the first test case is a new test case (332).

On the other hand, when the similarity score exceeds the minimum reference value, the controller 120 determines whether it is possible to merge the first test case and the second test case (321).

As described above with reference to FIG. 3, the received test case may be a new test case or a test case obtained by changing or adding an existing scenario. When the received test case is the latter, the controller 120 changes, that is, updates, a previously stored test case to the received test case.

Referring back to FIG. 4, when it is determined that the first test case is similar to the second test case but requires a modification, the controller 120 classifies the first test case as a merged test case (331). Even when the similarity score is within the preset range, that is, between the maximum reference value and the minimum reference value, the first test case may not be merged with the second test case. In this case, the controller 120 may classify the first test case as a new test case (332). The maximum reference value and the minimum reference value that are comparison standards for a similarity score are preset values and may be changed by a user.

Figure 5:
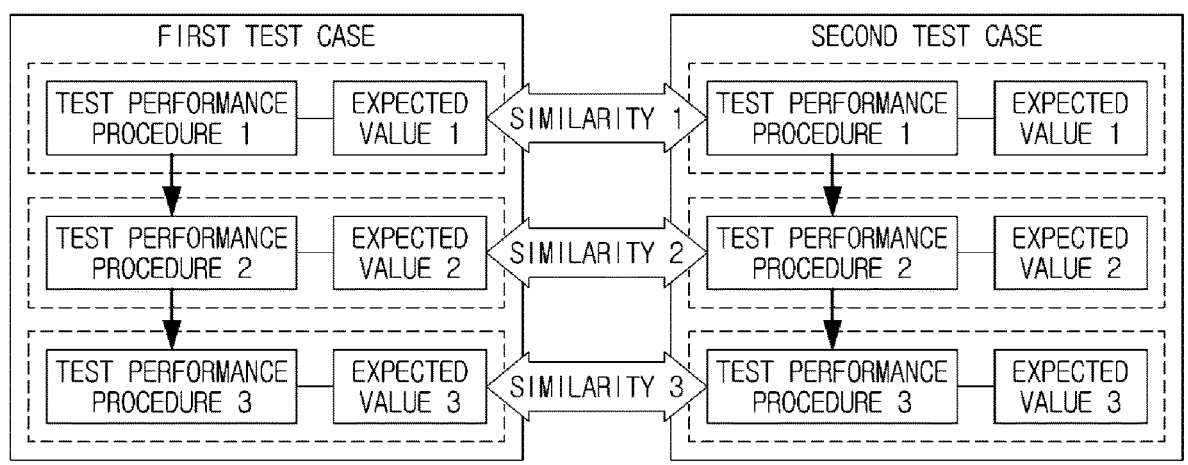
FIG. 5 is a diagram illustrating a method of calculating a similarity score according to exemplary embodiments of the present disclosure.

FIG. 5 is a diagram illustrating a method of calculating a similarity score according to exemplary embodiments of the present disclosure.

Referring to FIG. 5, the controller 120 separately maps test performance procedures 14 and expected values 15 to each other among items of a received test case (a first test case) and a test case to be compared (a second test case) and compares the pair of test performance procedures 14 and the pair of expected values 15.

As described above with reference to FIG. 1, the test performance procedures 14 denote input values input to multimedia equipment, which is a test target, and the expected values 15 denote expected output values for the test target to be determined as "normal."

As shown in FIG. 5, the first test case according to the example may include test performance procedures 1 to 3, and the test performance procedures may separately include expected values 1 to 3. Also, the second test case according to the example may include test performance procedures 1 to 3, and the test performance procedures may separately include expected values 1 to 3.

The controller 120 calculates individual similarity scores by comparing strings of the test performance procedures, and calculates individual similarity scores by comparing strings of the expected values. For example, test performance procedure 1 is compared with test performance procedure 1 of the second test case, and expected value 1 is compared with expected value 1 of the second test case.

Also, test performance procedure 2 is compared with test performance procedure 2 of the second test case, and expected value 2 is compared with expected value 2 of the second test case. Finally, test performance procedure 3 is compared with test performance procedure 3 of the second test case, and expected value 3 is compared with expected value 3 of the second test case.

A method of calculating individual similarity values will be described below with reference to FIGS. 6 and 7.

FIG. 6 is a diagram illustrating the Smith-Waterman algorithm according to exemplary embodiments of the present disclosure.

As described above with reference to FIG. 1, the Smith-Waterman algorithm is a method of measuring a similarity between two strings by comparing the two strings letter by letter and then giving a score.

The Smith-Waterman algorithm employs a recurrence formula such as Equation 1 given below.

$$H_{ij} = \max \begin{cases} H_{i-1,j-1} + s(a_j, b_j), \\ \max_{k \geq 1} \{H_{i-k,j} - W_k\}, \\ \max_{l \geq 1} \{H_{i,j-l} - W_l\}, \\ 0 \end{cases} \quad \text{[Equation 1]}$$

$(1 \leq i \leq n, 1 \leq k \leq n, 1 \leq j \leq m, 1 \leq l \leq m)$ $H_{ij}$ denotes a highest score that may be obtained by comparing individual strings up to $i^{th}$ and $j^{th}$ letters. $S(a_i, b_j)$ denotes a similarity between arbitrary letters a and b, and $W_k$ denotes a penalty score when a length k of one string is not compared with the other string in the comparison.

When two strings "DESIGN" and "IDEAS" are compared using the Smith-Waterman algorithm, result values shown in FIG. 6 may be generated. The individual scores of FIG. 6 are calculated by giving 5 points when letters of the two compared strings are identical, giving −5 points when letters are different, and using −1 point as a penalty score.

Referring to FIG. 6, it is possible to see that $H_{5,6}$ has the highest score of 14. Also, it is possible to see that the most similar partial string is "DES" by backtracking the highest score.

Meanwhile, the controller 120 according to the disclosed example calculates a similarity score of a string using a method that is different from the Smith-Waterman algorithm.

Specifically, according to the Smith-Waterman algorithm, a similarity score is calculated with a given penalty value or compensation value. Such a method does not have a certain standard and may be changed by designation of a user. Therefore, when a whole string to be compared is longer and more similar, a similarity obtained using the Smith-Waterman algorithm is lowered in reliability. For example, the Smith-Waterman algorithm outputs different similarity scores from a pair of strings "A-A" that are completely identical to each other and another pair of strings "AAA-AAA" that are completely identical to each other, and the similarity scores may vary by about three times according to given values.

Also, the Smith-Waterman algorithm is useful to determine a similarity of a partial string, but there is a limitation in determining a whole string including several words like the disclosed test case. For example, with regard to two strings "power off" and "power off and then immediately on," the existing Smith-Waterman algorithm detects the similar string "power off" and then determines that the two strings are very similar. However, "power off" and "power off and then immediately on" actually denote different operations. In other words, even when the same string is partially included, whole strings may not be similar at all, and it is difficult to determine a similarity between test cases by using only the Smith-Waterman algorithm.

Therefore, the controller 120 according to the disclosed example calculates a similarity score using a ratio for determining a similarity regarding continuity of strings.

FIG. 7 is a diagram illustrating a similarity analysis method according to exemplary embodiments of the present disclosure.

FIG. 7 shows result values obtained by calculating similarities between "DESIGN" and "IDEAS," like FIG. 6.

Specifically, FIG. 7 shows results of calculating similarity scores by giving 10 points when two letters of the strings "DESIGN" and "IDEAS," for example, ID-DE or DE-ES, are identical, giving 15 points when two letters are different, and using −15 point as a penalty score.

Referring to FIG. 7, it is possible to see that a similarity score between "DESIGN" and "IDEAS," that is, $H_{5,6}$, is −45 points.

A highest score of two strings having lengths of 5 and 6 is 35 points (Equation 2), and a lowest score is −90 points (Equation 3). Here, a position of H5,6 (−45 points) is calculated to be 36% in ratio to the range from the lowest score to the highest score using Equation 4.

(The minimum number of letters between two strings×10 points)+(the difference between the numbers of letters of the two strings×−15 points)=highest score      [Equation 2]

(The maximum number of letters between two strings×−15 points)=lowest score      [Equation 3]

$$\frac{|\text{Actual score}|}{|\text{Highest score}| + |\text{Lowest score}|} \times 100 = \text{Similarity score} \quad \text{[Equation 4]}$$

In other words, according to the similarity analysis method of the present disclosure, a ratio is calculated. Such a calculated ratio is defined below as a similarity score of the present disclosure.

Figure 8:
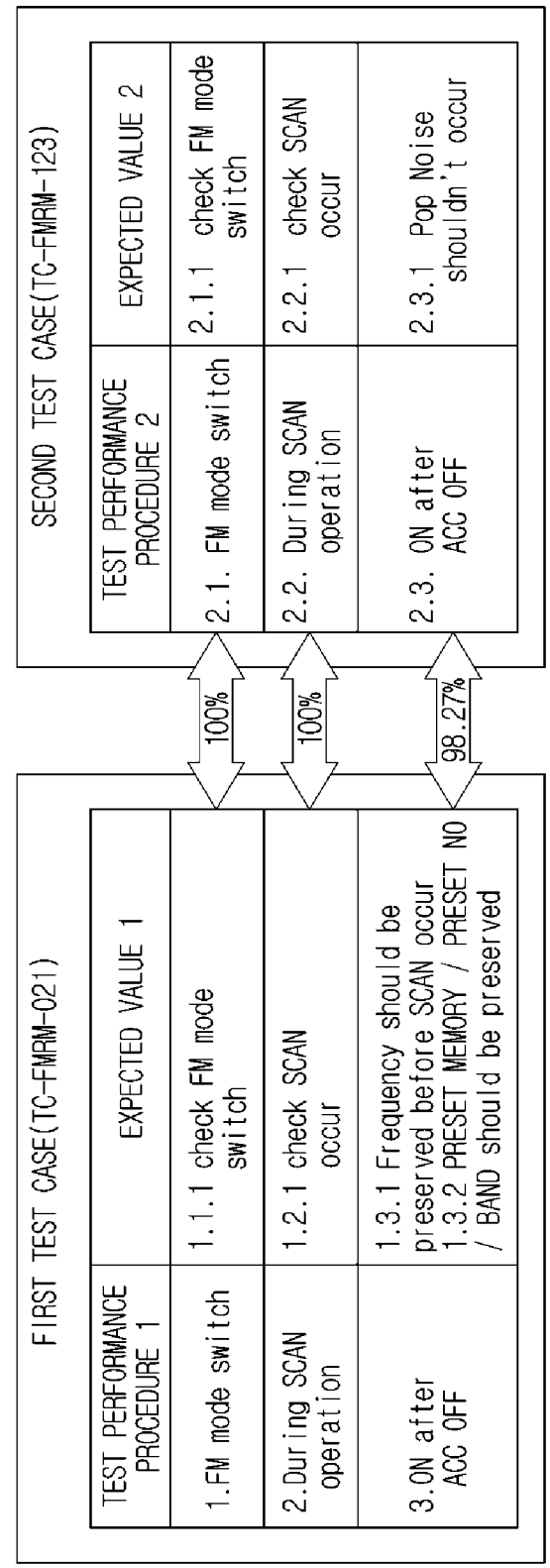
Figure 9B:
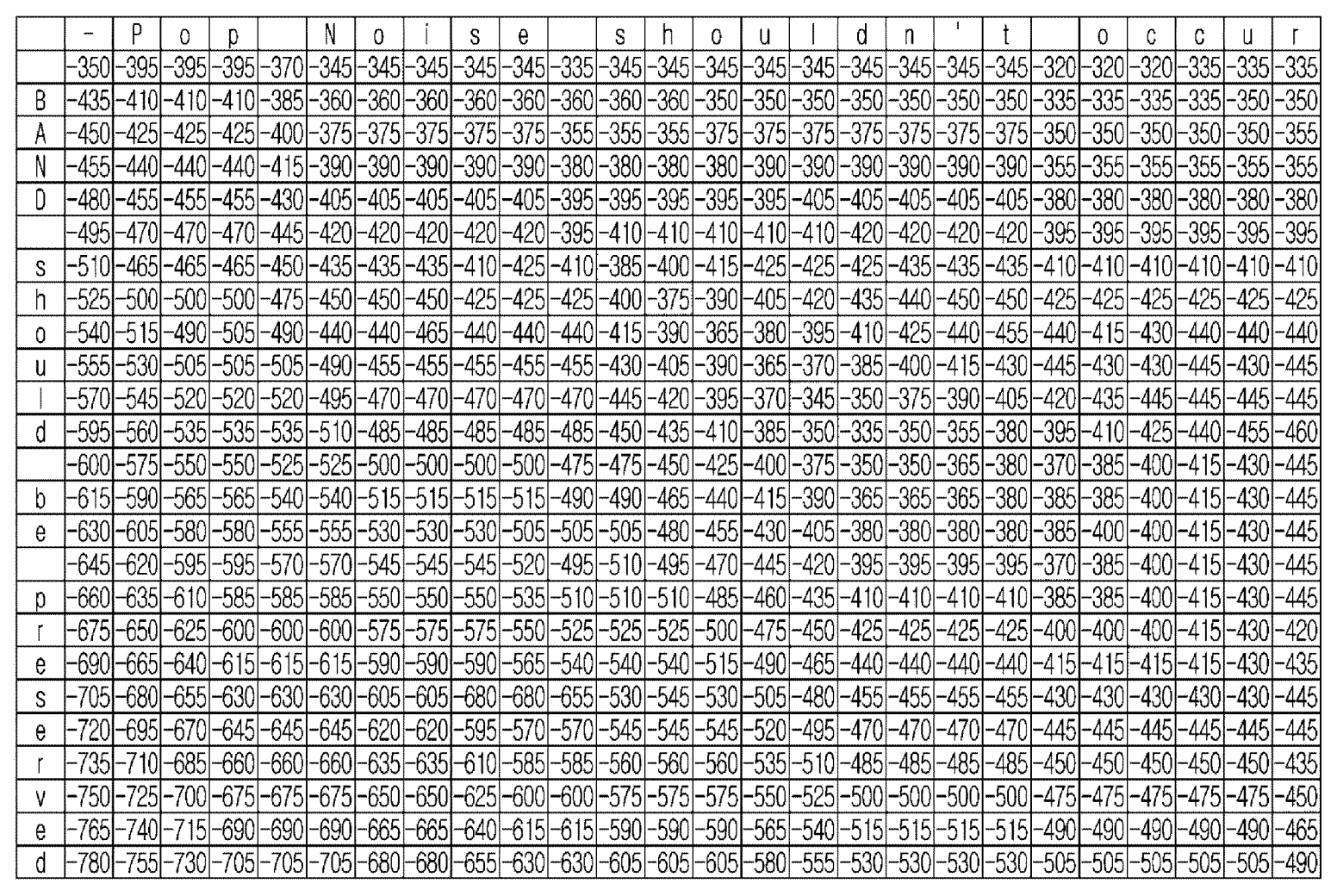

FIGS. 8, 9A and 9B are diagrams illustrating a method of calculating a similarity score of a test case according to an embodiment. To prevent duplicate descriptions, FIGS. 8, 9A and 9B will be described together below.

Referring to FIG. 8 first, an ID 11 of a received test case, that is, a first test case, is TC-FMRM-021, and an ID 11 of a second test case that has been stored already and will be compared with the first test case is TC-FMRM-123.

Here, test performance procedure 1 of the first test case, FM mode switch (1.1) has the same string as test performance procedure 2 of the second test case, FM mode switch (2.1). Also, expected values 1 and 2 corresponding to test performance procedures 1 and 2 have the same string, check FM mode switch. Therefore, the first test case and the second test case have a similarity score of 100% in test performance procedure and expected value.

Test performance procedure (1.3) of the first test case has the same string as test performance procedure (2.3) of the second test case. However, expected value (1.3.1) or (1.3.2) of the first test case has a different string than expected value (2.3.1) of the second test case. In other words, a similarity score between test performance procedure (1.3) of the first test case and test performance procedure (2.3) of the second test case is not 100%.

Meanwhile, a test case has a test performance procedure 14 and an expected value 15. In the disclosed example, the controller 120 calculates a similarity score by comparing the string of test performance procedure 1 of the first test case and the string of the test performance procedure 2 of the second test case, calculates a similarity score by comparing the string of expected value 1 of the first test case and the string of expected value 2 of the second test case, and then calculates an overall similarity score by aggregating the similarity scores.

Referring to FIG. 8, an overall similarity score of test performance procedure (1.3) and expected value (1.3.2) of the first test case and the test performance procedure (2.3) and expected value (2.3.1) of the second test case is 98.27%. Specifically, test performance procedure (1.3) of the first test case and test performance procedure (2.3) of the second test case have the same string "On after ACC OFF." However, the expected values are different.

For example, when expected value (1.3.2) of the first test case "PRESET MEMORY/PRESET NO/BAND should be preserved" is compared with expected value (2.3.1) of the second test case "Pop Noise shouldn't occur," an individual similarity score is calculated to be 48%.

Referring to FIGS. 9A and 9B, results of comparing expected value (1.3.2) and expected value (2.3.1) are shown. Here, each letter, sign, and space of "PRESET MEMORY/PRESET NO/BAND should be preserved" are arranged in a column, and each letter, sign, and space of "Pop Noise shouldn't occur" are arranged in a row.

Subsequently, the controller 120 compares two letters among arranged letters, signs and spaces. After the comparison, the controller 120 gives 10 points when the two letters coincide with each other, gives 15 points when the two letters do not coincide with each other, and uses −15 points as a penalty score.

For example, when "PR" in the column and "Po" in the row are compared in FIG. 9A, there is one same letter between the two letters. Therefore, a result value of FIG. 9A is −5 points. When scores are given in this way, a final score of expected value (1.3.2) and expected value (2.3.1), that is, $H_{52,25}$ of FIG. 9B, is calculated to be −490 points.

Also, when the string of 52 letters of expected value (1.3.2) and the string of 25 letters of expected value (2.3.1) are substituted to Equations 2 and 3 described above with reference to FIG. 7, a highest score is −150 points, and a lowest score is −780 points. A similarity score is calculated to be 48.0% using Equation 4.

An overall similarity score is calculated by applying weights to individual similarity scores calculated from a test performance procedure and an expected value. Equation 5 below is used to calculate the overall similarity score.

$$\begin{aligned}&(\text{Similarity score of test performance procedure} \times \\ &\quad 0.9) + (\text{similarity score of expected value} \times 0.1) \\ &\quad = \text{overall similarity score}\end{aligned} \quad [\text{Equation 5}]$$

Specifically, a weight according to an embodiment may be set to 90% for a test performance procedure 14 and set to 10% for an expected value 15. Since an expected value 15, which corresponds to a judgement condition, has little influence on a test operation, different weights are used. Therefore, when test performance procedures 14 are the same, a similarity between tests cases is high.

Meanwhile, weights used to calculate an overall similarity score may vary according to a setting of a user, and similarity scores may be calculated without applying weights and then compared.

Figure 10:
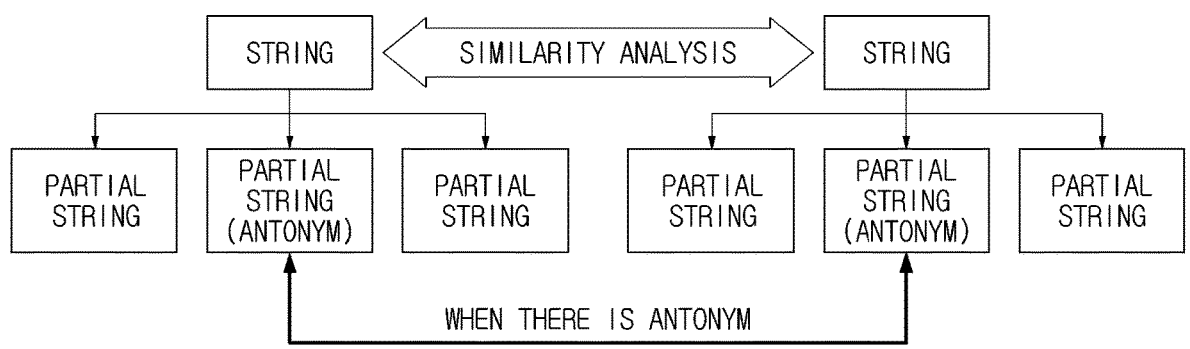
FIG. 10 is a diagram illustrating a similarity determination method according to exemplary embodiments of the present disclosure.

FIG. 10 is a diagram illustrating a similarity determination method according to exemplary embodiments of the present disclosure.

Since a test case is specified in a natural language, a similarity of the test case is determined based on a string comparison as described above. However, according to the above-described method of calculating a similarity score, the meaning of a string is not interpreted. Therefore, even when strings have opposite meanings, a similarity score therebetween may be calculated to be high.

A controller 120 according to another disclosed embodiment may adjust a calculated similarity score based on an antonym dictionary. Specifically, the controller 120 divides a string to be compared into partial strings and then searches a pre-stored antonym dictionary for the partial strings. Subsequently, when a partial string of a first test case and a partial string of a second test case are antonyms to each other, the controller 120 may reduce a calculated similarity score (or an overall similarity score) to a predetermined ratio. Here, the predetermined ratio may be varied, and the antonym dictionary may be stored in a memory 124 or changed in setting by a user.

FIGS. 11 and 12 are diagrams illustrating effects of a test case management method according to exemplary embodiments of the present disclosure. To prevent duplicate descriptions, FIGS. 11 and 12 will be described together below.

After 1153 test cases are stored in the DB 130 of the disclosed test case management system, the 1153 cases are input again, compared with other stored test cases, and then classified as 1153 merged and new test cases based on similarity scores.

The table of FIG. 11 shows results of determining whether it is possible to merge test cases according to similarity range before test cases are classified.

Specifically, in relation to a main function of multimedia equipment, similarity scores are calculated, and 358 test cases are extracted as candidates for merging. Ranges of similarity score are set in units of 10%, and ranges having a similarity score of smaller than 80% are set to have no use for merging.

As a result, a total of 114 test cases have a similarity score of 100% among the 1153 test cases, and 101 test cases among the 114 test cases, that is, 88.6%, are mergeable candidates. There are 610 test cases whose similarity scores are calculated to be 90% to 99%, and 415 test cases among the 610 test cases, that is, a total of about 68.0%, are mergeable. There are 858 test cases whose similarity scores are calculated to be 80% to 89%, and 240 test cases among the 858 test cases, that is, a total of about 28.0%, are mergeable.

Next, it is determined whether it is possible to merge all the mergeable test cases of FIG. 11 with second test cases, and all the mergeable test cases are merged with second test cases.

Also, when a similarity score is 100%, it is determined whether a corresponding test case is a duplicate test case, and when the test case is determined to be a duplicate test case, the test case is discarded.

Results of managing the total of 1153 test cases through the above process are shown in FIG. 12.

Referring to FIG. 12, as results of managing the 1153 test cases, three duplicate test cases are found and discarded, and 329 mergeable test cases are found and merged with second test cases.

Consequently, the disclosed test case management system reduces tests targets from 1153 to 821, that is, by about 29% of the test cases.

In other words, the disclosed test case management system and method make it possible to save time by preventing a repeated comparison of a duplicate test case and to quantitatively manage test cases according to similarity scores rather than existing experience or intuition of a person, and thus are useful to ensure efficiency and objectivity of management.

As is apparent from the above description, a test case management system and method according to an aspect of the present disclosure analyze similarities by comparing test cases to be used and test cases that have been compared with other stored test cases and stored, classify the plurality of test cases according to analysis results, and thereby make it possible to improve test efficiency and prepare for a quantitative standard for managing test cases.

What is claimed is:

1. A test case management system, comprising:
an input and output (I/O) interface for receiving a first test case;
a database (DB) for storing a second test case; and
a controller for comparing the first test case with the second test case based on a similarity score between a string of the first test case and a string of the second test case,
wherein the similarity score is calculated based on a ratio of a score calculated based on a continuity of letters of the string of the first test case and a continuity of letters of the string of the second test case to a score of a total of all of the strings,
wherein the I/O interface includes an input device configured to receive an input command of a user and a display configured to output test results,
wherein the controller compares the similarity score with a predetermined range and classifies the first test case, and
wherein the controller tests multimedia equipment according to a test performance procedure of the first test case based on a result of the classification.

2. The test case management system according to claim 1, wherein the first test case includes at least one of the test performance procedure or an expected value, and the second test case includes at least one of a test performance procedure or an expected value.

3. The test case management system according to claim 2, wherein the controller calculates similarity scores by separately comparing strings included in the test performance procedures and the expected values, and calculates the overall similarity score by adjusting and using weights for the similarity score between the test performance procedures and the similarity score between the expected values.

4. The test case management system according to claim 1, wherein the controller classifies the first test case as a new test case when the similarity score is smaller than a minimum reference value of the predetermined range, and
the DB stores the first test case as a new test case.

5. The test case management system according to claim 1, wherein the controller merges the first test case with the second test case when the similarity score is within the predetermined range, and
the DB stores the merged second test case.

6. The test case management system according to claim 1, wherein the controller discards the first test case when the similarity score exceeds a maximum reference value of the predetermined range.

7. The test case management system according to claim 1, wherein, when a part of the string of the first test case and a part of the string of the second test case are pre-stored antonyms to each other, the controller modifies the similarity score and compares the first test case with the second test case.

8. A test case management method, comprising:
receiving a first test case via an input and output (I/O) interface;
storing a second test case;
comparing the first test case with the second test case based on a similarity score between a string of the first test case and a string of the second test case;
comparing the similarity score with a predetermined range and classifying the first test case; and
testing multimedia equipment according to a test performance procedure of the first test case based on a result of the classification,
wherein the similarity score is calculated based on a ratio of a score calculated based on a continuity of letters of the string of the first test case and a continuity of letters of the string of the second test case to a score of a total of all of the strings, and
wherein the I/O interface includes an input device configured to receive an input command of a user and a display configured to output test results.

9. The test case management method according to claim 8, wherein the first test case includes at least one of the test performance procedure or an expected value, and the second test case includes at least one of a test performance procedure or an expected value.

10. The test case management method according to claim 9, wherein the step of comparing the first test case with the second test case comprises calculating similarity scores by separately comparing strings included in the test performance procedures and the expected values, and comparing the first test case with the second test case by adjusting weights for the similarity score between the test performance procedures and the similarity score between the expected values.

11. The test case management method according to claim 8, wherein the step of classifying the first test case comprises classifying the first test case as a new test case when the similarity score is smaller than a minimum reference value of the predetermined range, and the step of storing the second test case comprises storing the first test case as a new test case.

12. The test case management method according to claim 8, wherein the step of classifying the first test case comprises merging the first test case with the second test case when the similarity score is within the predetermined range, and the step of storing the second test case comprises storing the merged second test case.

13. The test case management method according to claim 8, wherein the step of classifying the first test case comprises discarding the first test case when the similarity score exceeds a maximum reference value of the predetermined range.

14. The test case management method according to claim 8 further comprising outputting a result of the test through the display.

* * * * *